United States Patent [19]
Parrish

[11] 3,964,304
[45] June 22, 1976

[54] SMOKE GENERATOR

[76] Inventor: Kemp L. Parrish, 35 N. Juniper St., Hampton, Va. 23669

[22] Filed: Apr. 25, 1975

[21] Appl. No.: 571,895

Related U.S. Application Data

[63] Continuation of Ser. No. 463,924, April 24, 1974, abandoned.

[52] U.S. Cl. ................................................. 73/147
[51] Int. Cl.² ........................................... G01M 9/00
[58] Field of Search ....................................... 73/147

[56] References Cited
UNITED STATES PATENTS

| | | |
|---|---|---|
| 1,676,984 | 7/1928 | Fales et al. ............................. 73/147 |
| 2,703,488 | 3/1955 | Gevantman et al. ............ 73/147 UX |
| 3,769,833 | 11/1973 | Ordway et al. ........................ 73/147 |
| 3,869,909 | 3/1975 | Hale et al. ............................. 73/147 |

OTHER PUBLICATIONS

Pankhurst, R. C. et al., *Wind–Tunnel Technique*, London, Pitman & Sons, Ltd., 1952, pp. 140–148.

*Primary Examiner*—Richard C. Queisser
*Assistant Examiner*—Joseph W. Roskos
*Attorney, Agent, or Firm*—Howard J. Osborn; Wallace J. Nelson; John R. Manning

[57] ABSTRACT

A compact, inexpensive, efficient smoke generator employing a novel method of smoke production for use in wind tunnel testing and the like.

6 Claims, 3 Drawing Figures

SMOKE GENERATOR

ORIGIN OF THE DISCLOSURE

The invention described herein was made by an employee of the United States Government and may be manufactured and used by or for the Government for governmental purposes without the payment of any royalties thereon or therefor.

This is a continuation of application Ser. No. 463,924, filed Apr. 24, 1974, now abandoned.

BACKGROUND OF THE INVENTION

This invention relates generally to an apparatus for vapor production and particularly to an efficient compact and inexpensive smoke generator for wind tunnel use.

In the field of wind tunnel research a need has arisen for a portable, lightweight, inexpensive smoke generator large enough to provide visible indication of the airflow over a model being tested but small enough in physical size so as to reduce its effect upon the indicated airflow. In the past, this has been accomplished by large bulky devices which disturb the airflow around the model such that a poor indication of the true airflow was presented.

It is therefore an object of the present invention to provide a smoke generator with the capability of indicating airflow around a model, in an operating wind tunnel, with a negligible effect thereon.

Another object of the present invention is a smoke generator with a high efficiency and capacity while remaining simple to construct and use.

A further object of the present invention is to provide a smoke generator with high efficiency and reduced size.

BRIEF SUMMARY OF THE INVENTION

Accordng to the present invention, the foregoing and other objects are attained by providing a heater assembly surrounded by a coil of tubing supplied at one end with a smokeproducing liquid with the other end open. The liquid is heated as it passes along the coil and produces a dense smoke that issues from the open end of the tubing coil.

DETAILED DESCRIPTION

A more complete appreciation of the invention and many of the attendant advantages thereof will be readily apparent as the same becomes better understood by reference to the following detailed description when considered in connection with the accompanying drawing wherein.

Figure 1:
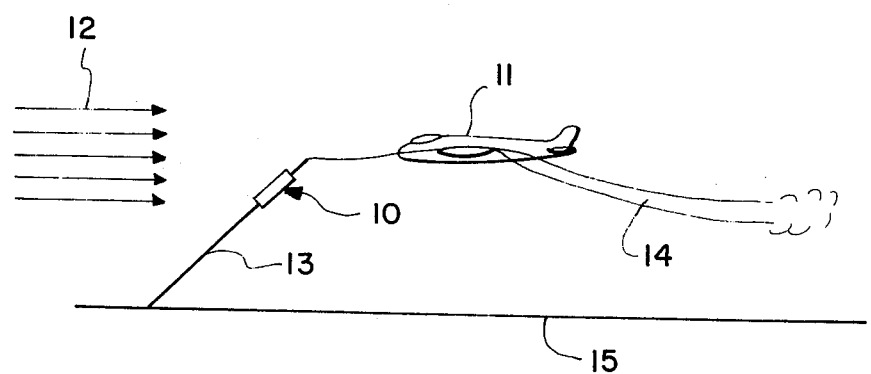
FIG. 1 is an illustration view of the smoke generator of the present invention in operation.
Figure 2:
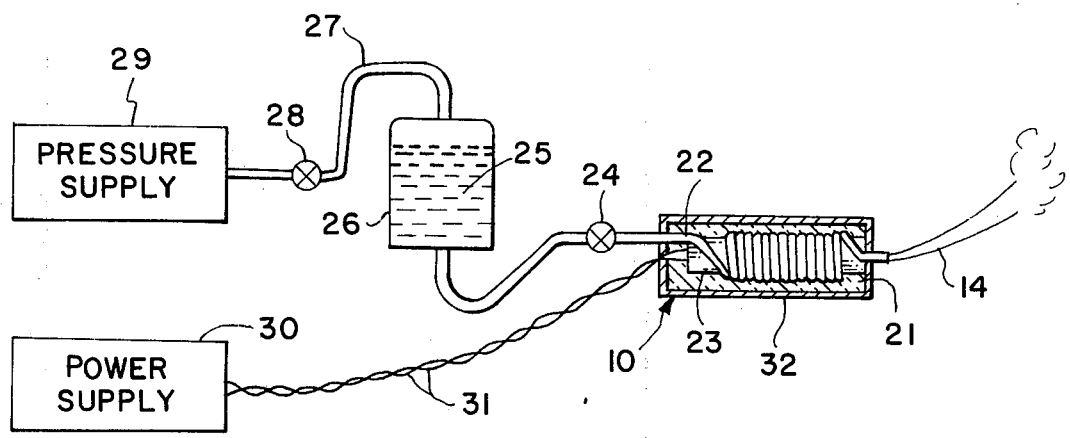
FIG. 2 is a part schematic illustration of the smoke generator shown in FIG. 1 with its attendant power and liquid supply systems.

Referring now to the drawings wherein like reference numerals designate identical parts throughout the several views. The smoke generator 10 is depicted in FIG. 1 as attached to a support wand 13 in a typical wind tunnel 15. The airflow, designated by arrows 12, blows the smoke produced by smoke generator 10 past aircraft model 11 indicating visually the resultant airflow 14. In FIG. 2 smoke-producing fluid 25 is forced into smoke generator 10 by pressurizing fluid supply vessel 26. In this specific application, 50 psi of air pressure is provided from pressure supply 29 through pressure valve 28 and connecting tubing 27. The flow of this fluid which may be any fluid which produced a visable smoke when vaporized such as kerosene, fuel oil, hydraulic oil or diffusion pumo oil, to the generator is controlled by needle valve 24. Electrical power 30 is supplied to smoke generator 10 through connecting wires 31 and may be controlled at 0 to 140 volt via a variable transformer (not shown) allowing control over the amount of heat and thus the temperature of the heater element 23.

Figure 3:
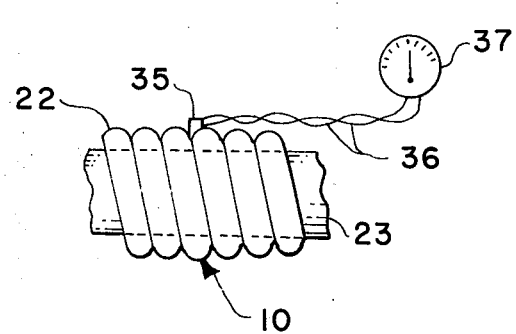
FIG. 3 illustrates one type of temperature monitor attached to the smoke generator of the present invention.

In the preferred embodiment, smoke generator 10 is physically comprised of 0.060 inch diameter monel tubing 22 coiled around a typical heater element, here a 300 watt, 115 volt Fire Rod 365 from Watlow Co., St. Louis, Mo., with one end of the coil connected to needle valve 24 and the other end 25 open to the atmosphere. The preferred smoke-producing liquid is commercially available as Dow-Corning 704 silicone diffusion pump oil. Heat produced by heater element 24 is retained by wrapping the coil heater assembly with any suitable insulation such as Hecko B-100 quartz batting insulation 21 available from Hecko Material Division, 2302 Marietta Boulevard, Northwest Atlanta, Ga. FIG. 3 indicates the spot welding of any suitable temperature measuring device, such as a chromel-alumel type K thermocouple 35 to the monel tubing coil 22, with connecting wires 36, to a suitable meter device such as a Thermo-Electric Mini-Mite monitoring meter 37; both meter and thermocouple available from the ThermoElectric Company, 109 5th Street, Sattle Brook, Mo. The total size of the assembled generator is 1½ inch in diameter by 6 inches long which includes heater element 23, thermocouple 35, fluid-carrying coil 22, insulation 21 and outer casing 32.

OPERATION

The operation should now be apparent. To start the flow of smoke, the pressure in the pressure supply 29 in FIG. 1 is applied to the full supply tank 26 by fully opening pressure valve 28. The liquid 25, is allowed to flow into the coil 22 by opening the needle valve 24 only long enough for the coil to fill with fluid. The needle valve is then closed. The electrical power 30 is turned on and the voltage produced by the transformer contained therein is increased from 0 to approximately 110 volts. When the temperature indicated by the thermocouple meter 37 reaches 800°F. the needle valve 24 is reopened and the voltage is increased to raise and maintain the temperature at 900°F. which is the optimum vaporizing temperature for the preferred silicone oil used. To adjust the volume of smoke being produced by the generator, the needle valve 24 is adjusted to increase or decrease the liquid flow rate while adjusting the transformer to maintain the temperature at 900°F. To turn off the smoke generator, the power supply is turned off and, when the temperature drops to 300°F., both the pressure valve 28 and needle valve 24 are closed.

Although the invention has been described relative to a specific embodiment thereof, it is not so limited and many modifications and variations thereof will be readily apparent to those skilled in the art in the light of the above teachings. For example, the metal coil could surround the heat element as a chamber instead of a coil. Also, the components may be constructed of materials other than metal, such as high temperature plastics. Also, any suitable liquid that produces visible vapor when heated may be used depending upon the vapor desired by adjusting the pressure, flow and temperature of the fluid passing through the coil. Additionally, the method of supplying heat to the invention is not limited to electricity, but could include, for example, steam, radiant or atomic energy. Smaller generators could also be constructed as above and imbedded in the model's wing or body to eliminate possible generator effects on wind tunnel airflow. It is therefore to be understood that within the scope of the appended claims the invention may be practiced otherwise than as specifically described.

What is clamed as new and desired to be secured by Letters Patent of the United States is:

1. In combination, a wind tunnel for testing models in a moving airflow and a smoke generator disposed within the wind tunnel to produce smoke for visually indicating the airflow in the wind tunnel during a test comprising:
   a test section in said wind tunnel containing a model to be tested;
   a smoke generator positioned in said test section upstream from the model in such position as not to impede the airflow in said wind tunnel over the model including:
   a. an elongated heating means,
   b. a liquid conduction means in the form of a coiled tubular conduit encompassing and in close proximity to said heating means and having an inlet and an outlet, and
   c. a liquid supply means supplying a smoke-producing liquid to said liquid conducting means and disposed in fluid connection with the inlet of said conduit,
whereby, during a wind tunnel test fluid is supplied to said conduit by said liquid supply means and heated by said heating means to vaporize and produce smoke that exits through the conduit outlet to become entrained in the wind tunnel airflow and pass over the test model to thereby visually indicate tunnel flow over the model.

2. The apparatus of claim 1 wherein said heating means is comprised of a variable electrical heating means having a controllable varying heat production rate.

3. The apparatus of claim 1 wherein said liquid supply means is pressurized to provide an increased flow of vapor-producing fluid to said coiled tubular conduit.

4. The apparatus of claim 1 including insulation means encompassing said coiled tubular conduit to retain heat generated by said heater means.

5. The apparatus of claim 1 and further comprising temperature monitoring means for providing a measure of the temperature of the heated fluid, said temperature monitoring means including a thermocouple attached to said liquid-conducting means and a readout meter connected to said thermocouple and remotely positioned from said tunnel test section.

6. The apparatus of claim 1 wherein said smoke-producing fluid is a silicone diffusion pump oil.

* * * * *